United States Patent [19]

Wells et al.

[11] 3,954,465

[45] May 4, 1976

[54] ELECTROPHORETIC IMAGING MEMBERS

[75] Inventors: John B. Wells, Savannah; Paul C. Swanton, Webster; John W. Weigl, West Webster; Edward Forest, Rochester, all of N.Y.

[73] Assignee: Xerox Corporation, Stamford, Conn.

[22] Filed: Aug. 19, 1974

[21] Appl. No.: 498,694

Related U.S. Application Data

[60] Division of Ser. No. 290,618, Sept. 20, 1972, Pat. No. 3,850,627, which is a continuation of Ser. No. 104,389, Jan. 6, 1971, abandoned.

[52] U.S. Cl. ................................................. 96/1.5
[51] Int. Cl.$^2$ ........................................ G03G 5/04
[58] Field of Search ............... 96/1.3, 1 PE, 1.2, 1.5; 204/181 PE; 101/453, 457, 463

[56] References Cited
UNITED STATES PATENTS

| | | | |
|---|---|---|---|
| 3,140,175 | 7/1964 | Kaprelian | 96/1.2 |
| 3,384,565 | 5/1968 | Tulagin et al. | 96/1.3 |
| 3,666,472 | 5/1972 | Till et al. | 96/1.2 |
| 3,689,399 | 9/1972 | Ota | 96/1 PE |

*Primary Examiner*—David Klein
*Assistant Examiner*—John L. Goodrow
*Attorney, Agent, or Firm*—James J. Ralabate; David C. Petre; Gaetano D. Maccarone

[57] ABSTRACT

An electrophoretic imaging process wherein a suspension of particles in a carrier liquid are placed between a photoconductive electrode and a second electrode. With an electrical field applied between the photoconductive electrode and the second electrode the photoconductor is exposed to imagewise radiation which causes particles on the surface of the photoconductive electrode to be driven away in image configuration by charge exchange with the photoconductive electrode. The migrating particles form a negative image on the second electrode leaving a positive image behind on the photoconductive electrode.

6 Claims, 10 Drawing Figures

ELECTROPHORETIC IMAGING MEMBERS

CROSS-REFERENCE TO RELATED CASES

This application is a division of prior copending application Ser. No. 290,618, filed Sept. 20, 1972 now U.S. Pat. No. 3,850,627 which is a continuation of prior copending application Ser. No. 104,389, filed Jan. 6, 1971, now abandoned.

BACKGROUND OF THE INVENTION

This invention relates to imaging systems. More specifically this invention concerns an electrophoretic imaging system.

The use of photoconductors to form images is well known. For example, in xerography such as described in U.S. Pat. No. 2,297,691 to C. F. Carlson, photoconductors are widely used. In this process a layer of a photoconductor on a conductive substrate is first provided with a uniform electrostatic charge on its surface in the dark and is then exposed to a light image which causes the photoconductor to allow charge to dissipate through it to the conductor in light struck areas leaving a pattern of electrostatic charge on the surface of the photoconductor. This electrostatic image is then made visible by any number of methods. In one process finely divided particles of colorant called toner which is attracted by the electrostatic charge are cascaded across the photoconductor. Normally, a carrier material for the toner is used to ensure that all areas of the photoconductor are contacted with toner. The toner material may also be dispersed in an insulating carrier liquid; the combination is called a liquid developer. As liquid developer is brought into contact with the photoconductor the toner material is drawn out of the liquid and is held to the photoconductor by electrostatic attraction. Many variations of the above processes exist. In one variation shown in U.S. Pat. No. 2,892,709 to E. F. Mayer, the surface of the photoconductor is charged through a liquid developer layer while the photoconductor is exposed to a light image. The photoconductor will not accept a charge in illuminated areas thus forming an electrostatic image on dark areas. The toner material in the liquid developer is drawn to or precipitates on the surface of the photoconductor in the charged areas forming a visible image.

The above processes have a number of deficiencies. A major problem is that the photoconductors must be charged to an intitial potential and then discharged in image configuration to provide an electrostatic image of sufficient strength to attract toner particles. These two process steps take a certain amount of time to complete which slows process speed. The process of U.S. Pat. No. 2,892,709 requires that the charging of the photoconductor be accomplished through an insulating liquid having particles dispersed therein which is relatively inefficient. Also, the above processes are subject to background formed by particles adhering to areas of the photoconductor which are not charged. These particles of toner in background areas interfere with final image quality.

Another disadvantage of prior art systems is that the photoconductive layer must be insulating enough to hold a high charge for the time necessary to develop an image. Further, the prior art processes require that the toner material be carefully selected to have the proper triboelectric relationships to the carrier material and to the charge on the surface of the photoconductor. Also, the prior art processes are not capable of producing positive and negative images at the same time and can change image sense only by the addition of complicated process steps.

SUMMARY OF THE INVENTION

It is an object of this invention to provide a method of imaging using a photoconductive layer which overcomes the above noted disadvantages.

It is another object of this invention to provide a novel electrophoretic imaging system.

It is another object of this invention to provide an electrophoretic imaging system which can utilize a relatively wide range of photoconductive layers.

It is another object of this invention to provide an electrophoretic imaging system which is capable of forming images out of a relatively wide range of materials.

It is another object of this invention to provide an electrophoretic imaging system capable of producing full color images.

It is another object of this invention to provide an electrophoretic imaging system capable of producing positive images directly from negative input.

It is another object of this invention to provide an electrophoretic imaging system which can simultaneously form positive and negative images.

It is another object of this invention to provide an electrophoretic imaging system capable of producing magnetically readable images from optical input.

The above objects and others are accomplished in accordance with this invention by providing an electrophoretic imaging system wherein finely divided particles dispersed in an insulating liquid are placed between a photoconductive injecting electrode and a second electrode. The photoconductive injecting electrode is exposed to a pattern of radiation to which it responds while a field is applied across the suspension between the photoconductive injecting electrode and the second electrode.

The photoconductive injecting electrode causes those particles which are within interaction range of the illuminated parts of the electrode to take on the same sign of charge as the photoconductive electrode and be repelled by it. These repelled particles migrate to the surface of the second electrode in image configuration forming a negative image on the surface of the second electrode and leaving a positive image behind. To obtain the greatest advantages of this invention where a uniform dispersion of particles in a liquid is used the dispersed particles are initially forced to the surface of the photoconductive electrode by application of field. For example, where the photoconductive electrode is held at a positive potential with respect to the second electrode during imaging the suspension is first charged negatively by, for example, a negative corona discharge which causes the particles to take on a negative charge. When the suspension is placed on the positive photoconductive electrode the particles are drawn to the surface of the photoconductive electrode leaving a relatively thick layer of particle-free liquid between the particles and the second electrode. When the photoconductor is exposed to radiation to which it is sensitive, particles which are adjacent to illuminated areas of the photoconductive electrode exchange charge with the photoconductive electrode and migrate through the liquid to the second electrode. The improvement in the process which arises from pre-charging may now be appreciated: when pre-charging is used initially only liquid contacts the second electrode and, therefore, background is measurably improved. In other words, the only particles which contact the second electrode are those which have migrated there as a result of charge exchange with the photoconductive electrode.

It is this change in charge polarity which distinguishes the present concept from prior art processes such as that shown in U.S. Pat. No. 2,892,709. The prior art processes do not involve change in polarity of toner particles upon contact with illuminated or unilluminated areas of photoconductive members. The present process is, therefore, clearly distinguishable from conventional xerographic processes wherein insulating particles are merely drawn to an area of high electrostatic potential.

Preferably, the photoconductive layer is applied to a transparent conductive substrate through which exposure is made while field is applied. This structure is preferred since it makes the most efficient use of the imagewise radiation. The photoconductive layer may be overcoated or a layer may be used between the photoconductive layer an the conductive substrate.

The particles which may be dispersed in the insulating liquid may be insulating, semiconductive or conductive and may comprise two or more components. Since it is essential that the particles be capable of accepting and retaining charge injected from the photoconductive electrode, it has been found desirably that the surface of the particles be made of a material which has a bulk resistivity of at least $10^5$ ohm cm and preferably $10^7$ ohm cm or greater. There is no known upper limit of operability in that particulate dyed plastics having resistivities of greater than $10^{13}$ ohm cm have been found to work very well.

In accordance with this invention images may be rapidly formed of virtually any particulate material. The particles may be, as stated above insulating, semiconductive or conductive. For the production of colored images, the particles may advantageously be dyed thermoplastic materials which are especially suitable for full color transparency or opaque image formation. The advantage of using dyed thermoplastic materials instead of opaque colored pigments is that brightly colored materials may be made which can readily be fused to form a fixed, final image. To produce a polychrome image two or more monochrome images are made which are transferred in register to a single substrate and fused thereon. For other applications the particles may be chosen to be reflective glass beads, luminescent, phosphors, ferromagnetic pigments, reflective resin coated metal particles, microcapsules containing liquids or other materials, catalytic or particles otherwise specially formulated for specific end uses when in the form of shaped patterns. For example, the images can be used as masks for graphic art purposes or as resists for etching.

The carrier liquid may comprise any suitable insulating material. Typical insulating liquids include decane, dodecane, tetradecane, kerosene, molten paraffin, molten beeswax, or other molten thermoplastic material, mineral oil, silicone oils such as dimethyl polysiloxane, fluorinated hydrocarbons and mixtures thereof. Mineral oil and kerosene are preferred because of their low cost and excellent insulating qualities. Alternatively, the colorant particles may be pre-coated on the photoconductive electrode in a solid binder such as Piccotex polystyrene resin available from Pennsylvania Industrial Chemical Co. or eicosane wax for ease of handling and storage. The binder is melted or dissolved by a dielectric solvent such as those listed above prior to imaging so that the particles are free to migrate from one electrode to another independently of one another. Other typical solvent-soluble dielectric binder materials include hydrogenated rosin esters such as Staybelite Esters 5 and 10 available from Hercules Powder Co., Phenoformaldehyde resins such as Amberol ST-137-X available from Pennsylvania Industrial Chemical Co.

It is desirable to use particles of a relatively small size because small particles provide more stable suspensions and provide images of higher resolution than would be possible with larger particles. It is thus preferred that the particles be less than 1 or 2 microns in average cross-section although particles up to about 5 microns may readily be used. No lower limit on particle size is presently known.

The concentration of particles dispersed in the liquid depends on the density of the final image desired, the use to which the image is to be put and the size of the particles, the solubility of added dispersants, and other factors generally known to those skilled in the art of ink or plastic coating formulation. For example, when finely divided dyed resinous materials are dispersed in mineral oil or kerosene from about one part by weight to about 50 parts by weight resinous material dispersed in 100 parts liquid provide satisfactory images.

The transparent conductive substrate for the photoconductive layer may comprise any suitable material. Typical transparent conductive materials include conductively coated glass, such as aluminum, or tin oxide coated glass or transparent plastic materials such as polyester films overcoated with similar materials and cellophane. Alternatively, a layer such as a resinous film or sheet may be placed between the photoconductive layer and its backing electrode. This is particularly desirable for applications wherein the photoconductive layer is to be used only for a single exposure. Also the photoconductive layer may be self-supporting.

The photoconductive layer may comprise any suitable photoconductive material. Typical photoconductive materials include inorganic materials such as cadmium sulfide, cadmium sulfoselenide, selenium, mercuric sulfide, lead oxide, lead sulfide, cadmium selenide, and mixtures thereof dispersed in binders or as homogeneous layers.

Typical organic photoconductive materials include pigments such as quinacridones, carboxanilides such as, 8,13-dioxodinaphtho-(2,1-b;2',3'-d)-furan-6-carbox-p-methoxy-anilide; 8,13-dioxodinaphtho-(2,1-b; 2',3'-d)-furan-6-carbox-m-chloroanilide; carboxamides such as N-2''-pyridyl-8,13,dioxdinaphtho-(2,1-b;2',3'-d)-furan-6-carboxamide; N-2''-(1'',3''-diazyl)-8,13-dioxodinaphtho-(2,1-b;2',3'-d)-furan-6-carboxamide; triazines benzopyrrocolines, anthraquinones, azo compounds particularly those having aromatic substituents with a hydroxyl group in a position ortho to the azo linkage, dioxazines, substituted pyrenes, phthalocyanines, dispersed in binders, and organic materials such as poly (N-vinyl carbazole); poly (9-vinyl anthracene); poly (3-vinyl pyrenes); which are homogeneous photoconductors whose sensitivity may be augmented by complexing suitable Lewis acids as described by H. Hoegl in the *Journal of Physical Chemistry*, 69, 755 (1965); poly (triphenylamine) as described in U.S. Pat. No. 3,265,496; poly (N-propenyl carbazole) as described in U.S. Pat. No. 3,341,472 and mixtures thereof. The photoconductor may comprise one or more components and may comprise photoconductive pigments dispersed in photoconductive or inert binders and may be overcoated with, for example, a protective layer of an active transport layer which is capable of transporting the type of charge which is desired to be imparted to the particles. An active transport layer for holes, for example, poly vinyl carbazole may be coated over an evaporated amorphous selenium layer or over a binder structure comprising the x-form of phthalocyanine or trigonal selenium or a mixture of both in an inert dielectric binder, or contained in a polyvinyl carbazole binder as long as the backing electrode is made positive relative to the opposing electrode. The speed at which images can be made can become dependent on the rate of carrier transport through the overcoating. It is, therefore, desirable to use materials capable of fast carrier transport.

A preferred photoconductive layer comprises selenium overcoated with a layer of poly (N-vinyl carbazole). The poly (N-vinyl carbazole) permits passage of photogenerated and injected holes but yet protects the selenium from abrasion and solvent attack.

Other overcoating materials which will protect photoconductors but allow passage either of holes or electrons or both include, poly (methylene pyrene), poly-1-vinyl pyrene, and binder dispersions of triphenylamine or 2,4,7 trinitro-9-fluorenone comprising more than about 30 weight percent of the above compounds.

The second electrode may comprise any suitable conductive material. Typical conductive materials include tin oxide coated glass, metals, conductive rubber carbon black binder dispersions and conductive paper.

The second electrode preferably has an insulating web or layer over its outer surface to help support the relatively high fields used in this invention. Typical insulating materials include, paper, polyethylene coated paper, cellulose acetate, nitro cellulose, polystyrene, polytetrafluoroethylene, and related fluorinated polyolefins, polyvinyl fluoride, polyurethane and polyethylene terephthalate.

BRIEF DESCRIPTION OF THE DRAWINGS

The advantages of this improved method of electrophoretic imaging will become apparent upon consideration of the detailed disclosure of this invention, especially when taken in conjunction with the accompanying drawings wherein.

Figure 1:
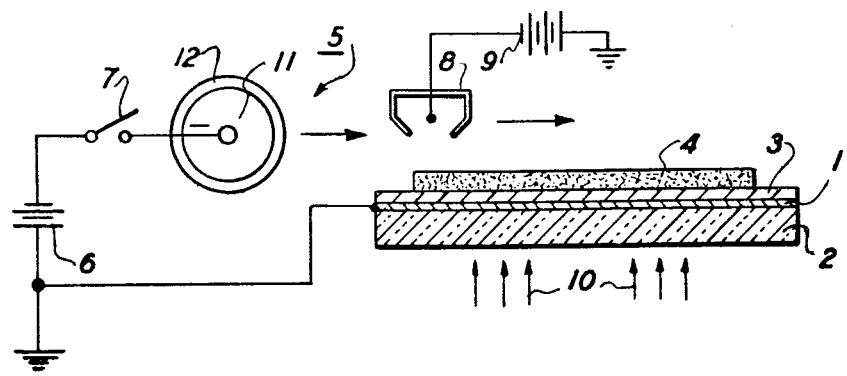
FIG. 1 is a side sectional view of a simple exemplary electrophoretic imaging system in accordance with this invention.

The sizes and shapes of the drawings should not be considered as actual sizes or even proportional to actual sizes because many of the elements have been purposely distorted in size or shape in order to more fully and clearly describe the invention Referring now to FIG. 1, there is seen a transparent conductive layer 1 on transparent substrate 2 which are in this exemplary instance made up of a transparent conductive layer of tin oxide on a glass substrate. Such electrodes are available commercially under the name NESA glass and are available from the Pittsburgh Plate Glass Co. There is no requirement that this electrode be transparent or conductive. For example, an insulating film of polyethylene terephthalate may be placed over the electrode and the system will still operate. This electrode may be a plate, drum, roller web, or ooher configuration.

On the surface of layer 1, there is provided photoconductive layer 3 which may be, for example, one micron selenium overcoated with a 3 micron layer of polyvinyl carbazole. On layer 3 there is provided a layer 4 of finely divided particles in an insulating carrier liquid. The layer may be, for example, finely divided particles of a dyed thermoplastic material in mineral oil. The particles may be fluorescent, glass beads or magnetic. The use of magnetic particles provides a method for converting a light image directly into a computer readable image. Further, the system can be used for preparing masters for printing. The images can be used as masks for graphic arts processes. Many variations are possible, for example, the unfused or unfixed image can be used as a mask for ink roll up to reverse the image sense of the image formed. The substrate behind an unfused image could be bleached to form a permanent image. The unfused image can be formed on a diazo substrate for forming a diazo image. The image can be used as a heat receptor for thermographic images. The particles can be selected to be inert to acids or solvents, the image serving as a resist when transferred to glass or metal for selective etching. The images can be foamed or built up for Braille use. By using methyl violet particles, hectograph masters may be formed.

Since the inert particles may comprise, for example, brilliantly colored thermoplastic materials, high quality full color images may be produced by transferring three or more monochrome images formed in this process to a substrate in register and fused thereon by a single heating step. Electrode 5 is held at a high potential, the naturally occurring corona generated at the nip between roller 5 and liquid 4 forces the particles to the surface of layer 3. After the particles have been driven to the surface of layer 3, an electrode generally designated 5 which is a conductive roller 11 covered by paper 12 is used to apply a field across suspension 4. Electrode 5 may be a drum, web, plate or other configuration. As roller 5 traverses suspension 4, switch 7 is closed which connects in this exemplary instance the negative terminal of source of high D.C. potential 6 to electrode 5. The opposite terminal of source 6 is connected to layer 1 and ground. It is not necessary that surface 12 be insulating but an insulating layer is preferred to help support the relatively high fields used in this process. For example, in an apparatus as shown in FIG. 1, 2500 volts and more are conventionally used.

Alternatively, corona source 8 may be used to traverse the suspension driving particles to layer 3. A roller held at a high potential may be substituted for corona source 8. The use of a separate charging member such as source of corona 8 is preferred since it is more efficient for depositing particles. After the particles have been driven to surface 3, electrode 5 traverses the suspension with field applied as shown. As roller 5 traverses layer 4, photoconductive layer 3 is exposed to imagewise radiation 10 which causes particles adjacent layer 3 in illuminated areas to migrate through the liquid and adhere to the surface of layer 12 in image configuration. This image may be fixed on surface 12, for example, by heat or transferred to another member as desired providing a negative image.

The remaining particles on the photoconductor may also be transferred to paper or film providing a positive image.

Figures 2A, 2B:
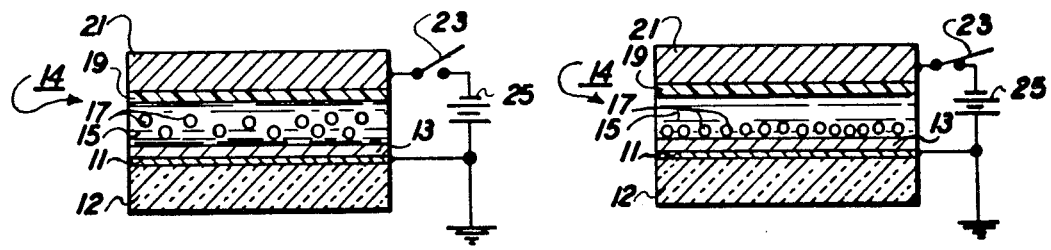
FIGS. 2A–D are diagrammatic representations of the process steps and particle migration responses which are believed to occur in the system.

Referring now to FIG. 2A there is shown transparent conductive layer 11 on transparent support 12. On layer 11 is coated photoconductive layer 13. Suspension 14 which comprises negatively charged finely divided particles 17 dispersed in liquid 15 is provided on photoconductor 13. Electrode 21 having insulating surface 19 is placed in contact with the suspension 14. With no field applied the particles are uniformly dispersed throughout the suspension.

Referring now to FIG. 2B, field is applied by closing switch 23 which connects source of D.C. potential 25 with conductive electrodes 21 and 11. Field application causes the negatively charged particles 17 to move toward electrode 11.

Figures 2C, 2D:
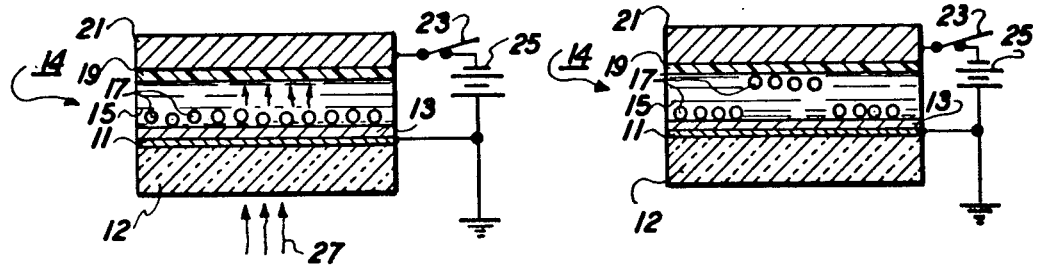

Referring now to FIG. 2C, photoconductor 13 is exposed to imagewise radiation 27 which causes charge carriers generated in the photoconductor to be injected into particles adjacent illuminated areas of photoconductor 13 and be repelled by it.

Referring now to FIG. 2D, particles 17 have migrated through the suspension and adhere to the surface of layer 19, forming a negative particulate image on surface 19 and leaving a positive particulate image behind on surface 13. Either image may be fixed in place or transferred to another member. Transfer may be assisted by application of field between the transfer member and the electrode to which the particles are adhering. The particles remaining on the photoconductor may be transferred using uniform illumination and electrical field to improve transfer efficiency.

Figure 3A:
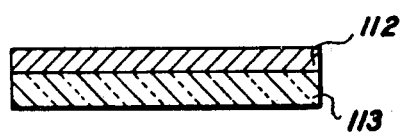
FIGS. 3A–E show alternative embodiments of the photoconductive layer.

Referring now to FIG. 3A, there is seen an embodiment for use in this invention wherein photoconductive layer 112 is placed on conductive transparent layer 113. The suspension of particles is placed directly on layer 112.

Figure 3B:
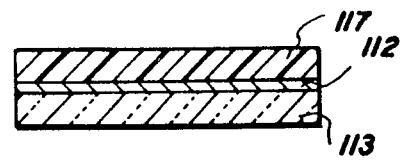

FIG. 3B shows an alternative embodiment in that photoconductive layer 112 on transparent conductive substrate 113 is overcoated to protect layer 112 from the action of solvents or abrasion. A preferred coating material 117 is a material which can transport carriers generated by layer 112 to the particles in the suspension which is coated on the surface of layer 117.

Figure 3C:
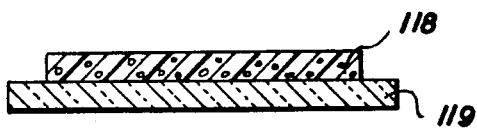

FIG. 3C shows an embodiment wherein photoconductive layer 118 comprises photoconductive particles dispersed in a binder forming a self-supporting film of photoconductor which during operation is placed on transparent conductive layer 119 and has the suspension coated on its free surface.

Figure 3D:
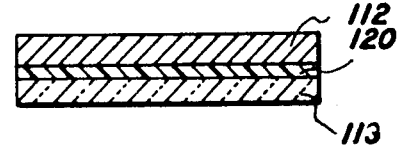

FIG. 3D shows an injecting electrode where a dielectric film 120 such as a polyethylene terephthalate is placed between the photoconductive layer 112 and transparent conductor 113. Layer 120 acts to support layer 113.

Figure 3E:
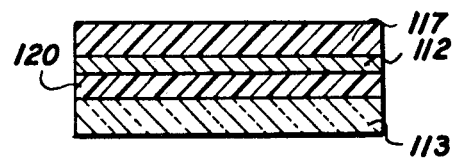

FIG. 3E shows an embodiment wherein photoconductive layer 112 supported by dielectric film 120 is overcoated with a transport material 17. This embodiment provides a protected photoconductive layer which may be readily recycled in the system and yet is flexible.

DESCRIPTION OF THE PREFERRED EMBODIMENTS

The following Examples further specifically illustrate the improved electrophoretic imaging system provided by this invention.

Parts and percentages are by weight unless otherwise indicated. The following Examples are intended to illustrate various preferred embodiments of the present invention. All of the Examples are carried out in an apparatus of the general type illustrate in FIG. 1. A 500 watt quartz iodine light source is used to illuminate a black and white negative transparency, the image being projected by a lens through the tin oxide coated glass on which the particular photoconductor is coated. The suspension is formed by dispersing finely divided particles of the specific material in an insulating liquid. The suspension is milled until the particles are less than about 2 microns in cross-section and are uniformly dispersed.

EXAMPLE I

A source of high potential is connected to a roller electrode which has a one inch diameter steel core and a ¾ layer of polyurethane having a resistivity of $5 \times 10^8$ ohm cm forming a 2.5 inch diameter roller. A paper sheet is placed over the polyurethane surface to receive the images. The other lead of the source of high potential is connected to the conductive surface of a NESA glass plate.

A 1 micron layer of selenium is vacuum evaporated onto the conductive surface of the NESA glass plate to form the photoconductive electrode. Approximately two parts of magenta dyed resin type R103-6 available from the Radiant Color Co., Richmond, California is suspended in about 5 parts of Sohio Odorless Solvent 3454, a mixture of kerosene fractions available from Standard Oil Co. of Ohio. This suspension is coated onto the selenium surface using a No. 4 Mayer coating rod. The roller electrode is rolled across the suspension at a rate of about 2 inches per second with a potential of about 3500 volts applied. The roller is held at a negative potential with respect to the photoconductive electrode. As the roller traverses the suspension, the photoconductor is exposed to light projected through a negative transparency. On completion of roller traverse a positive image is found adhering to the paper on the roller electrode and a negative image is found on the photoconductor surface.

EXAMPLE II

The experiment of Example I is repeated except that prior to roller traverse and imagewise illumination the suspension is subjected to a source of corona from a corona generating electrode held at a negative 7000 volts with respect to ground. The image formed on the paper is compared to the image formed in Example I. The image formed in this Example is found to have a decreased background.

EXAMPLE III

The experiment of Example II is completed except that the selenium is coated with a 0.5 micron protective layer of poly (N-vinyl carbazole) (PVK). The coating is applied by dissolving about 2 parts by weight PVK in 60 parts dioxane and 40 parts cyclohexanone and coating the solution on the selenium using a No. 4 Mayer rod. The coating is allowed to dry. The suspension is placed on this coating. PVK is an example of an active transport dielectric. On completion of roller traverse, a positive image of excellent quality is found adhering to the paper.

In the following Examples IV–VI, the particles are dispersed in a solid binder which is dissolved just prior to imaging by application of a solvent. These layers have an advantage in that colored liquids need not be handled.

EXAMPLE IV

A photoconductive layer is formed by dispersing about one part by weight of the X-form of metal-free phthalocyanine made as shown in U.S. Pat. No. 3,357,989 in a mixture containing 3 parts of PE-200 (a polyester resin available from Goodyear Tire and Rubber Co.), about 15 parts of methyl ethyl keytone, and about 10 parts of toluene. The slurry is coated on a 2.0 mil Mylar film, a polyester available from duPont using a No. 6 wire wound rod producing a photoconductive layer of about 4–5 microns dry thickness. This Mylar backed photoconductive layer is then overcoated with an ink suspension of about 2 parts by weight Lawter Cyan Blue (B-2858 HI-VIZ pigment available from the Lawter Chemicals Inc. Chicago, Ill.) and about one part eicosane, and 15 parts Sohio 3454, a mixture of kerosene fractions available from Standard Oil of Ohio using a No. 8 wire wound rod providing a 5–6 micron layer dry. This combination of photoconductor, substrate and particle-binder layers is placed on a NESA glass plate, the photoconductive layer in contact with the conductive NESA glass coating. The photoconductor is exposed and traversed by the roller as in Example I except that the paper on the roller is wetted with Sohio 3454 which dissolves the binder for the Lawter Cyan Blue pigment. On completion of roller traverse, a positive image is formed on the paper on the roller electrode. In this embodiment the photoconductive layer can be varied from about 1 to about 50 microns and the particle-binder layer can be varied from about 3 to about 20 microns with satisfactory results.

EXAMPLE V

The experiment of Example IV is repeated except that the photoconductive layer is replaced with a photoconductive layer made by coating about one part by weight Monastral Red B, a quinacridone pigment available from duPont, one part by weight PE-200, about 6 parts by weight methyl ethyl ketone and about 4 parts by weight toluene on 2.0 mil Myler as in Example IV. An image is formed as in Example IV.

EXAMPLE VI

The experiment of Example IV is repeated except that the photoconductive layer is made by coating a slurry of about 2 parts Indofast Yellow Lake Y-5713, available from Harmon Color, Division of Allied Chemical and Dye Company about one part PE-200, about 15 parts by weight methyl ethyl ketone and about 10 parts by weight toluene on 2 mil Mylar as in Example IV. A cyan image is formed as in Example IV with the exception that the roller is held at a positive about 3500 volts with respect to the NESA glass.

EXAMPLE VII

The experiment of Example III is repeated except that the magenta dyed resin particles are replaced by particles of iron oxide, Mapico EG3, available from Columbia Carbon Co., New York, New York, overcoated with melamine-formaldehyde resin. The paper receiver sheet is also replaced by a Mylar sheet available from duPont. The image formed may then be magnetized and used as a ferromagnetic master as shown, for example, in *Ferrography* by Atkinson and Ellis, *Journal of the Franklin Institute*, Volume 252, No. 5, November, 1951. It may also be used as a record in machines equipped for the automatic reading of magnetic patterns, for example, printed on a bank check and read in an automatic magnetic check sorter.

EXAMPLE VIII

The experiment of Example III is repeated except that the magenta dyed resin particles are replaced with particles of Luxol Fast Black L, a spirit soluble dye available from duPont. The image formed on the paper receiver sheet may then be used as a spirit master.

EXAMPLE IX–XI

Spirit masters are made in these Examples as in Example VIII except that in Example IX the particles are Grasol Fast Brilliant Red BL, available from Geigy Chemical Co., in Example X the particles are Luxol Fast Scarlet C and in Example XI the particles are gentian violet available from Hartman-Leddon Co.

EXAMPLE XII

In this Example a full color image is prepared by combining yellow, cyan and magenta monochroome images. First, red, yellow and blue separation images are prepared using conventional techniques to provide negative transparencies. A magenta image is made as in Example III using the proper separation image. A cyan image is formed as in Example III using Lawter Cyan Blue B2, as the particles, exposure being made through the proper separation image. A yellow image is formed as in Example III using Strong Lemon Yellow B2141, available from Lawter Chemical Inc. in place of the magenta particle. The three images are transferred in register to a receiver sheet. Since the particles are all resinous fusible materials fixing is accomplished by radiant or contact heating providing a full color positive image.

EXAMPLE XIII

The experiment of Example XII is repeated except that Sunset Yellow P6000 G, Blue R103-G-119 and Magenta P1700 available from Radiant Color Co., Richmond, California are used as the particles. The image is fixed as in Example XII.

Although specific components and proportions have been described in the above Examples, other materials as listed above, where suitable may be used with similar results. In addition, other materials may be added to the various layers to synergize, enhance or otherwise modify their properties. For example, the photoconductive layer may be dye-sensitized to alter its photoresponse.

Other modifications and ramifications of the present invention will occur to those skilled in the art upon a reading of the present disclosure. These are intended to be included within the scope of this invention:

What is claimed is:

1. An imaging member comprising a transparent conductive substrate carrying a photoconductive insulating material layer having a thickness of up to about 5 microns which carries a layer of a material capable of transporting at least one species of charge carrier which in turn carries a layer of a suspension comprising particles in an electrically insulating liquid.

2. The member as defined in claim 1 wherein said active transport material comprises poly (N-vinyl carbazole).

3. The member as defined in claim 1 wherein said particles have a surface having a bulk resistivity of about $10^5$ ohm cm or more.

4. The member as defined in claim 1 wherein said particles have a diameter of up to about 5 microns.

5. The member as defined in claim 1 wherein said particles have a diameter of up to about 2 microns.

6. The member as defined in claim 1 wherein said substrate comprises a transparent conductive material, said particles have a diameter of up to about 2 microns and said photoconductive insulating layer has a thickness of up to about 5 microns.

* * * * *